J. H. DEARBORN.
SPRING COUNTERBALANCING MECHANISM.
APPLICATION FILED MAR. 23, 1916. RENEWED JUNE 12, 1917.
1,233,758.
Patented July 17, 1917.
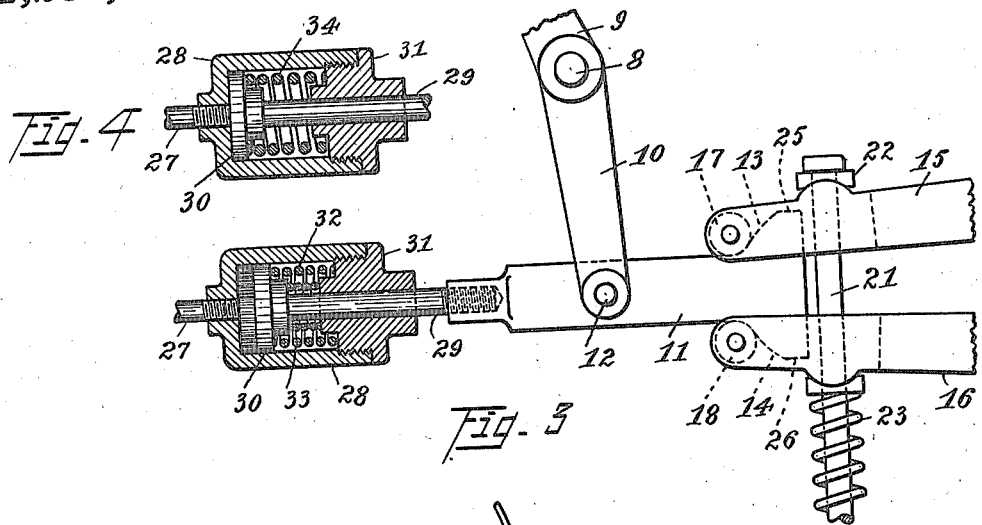
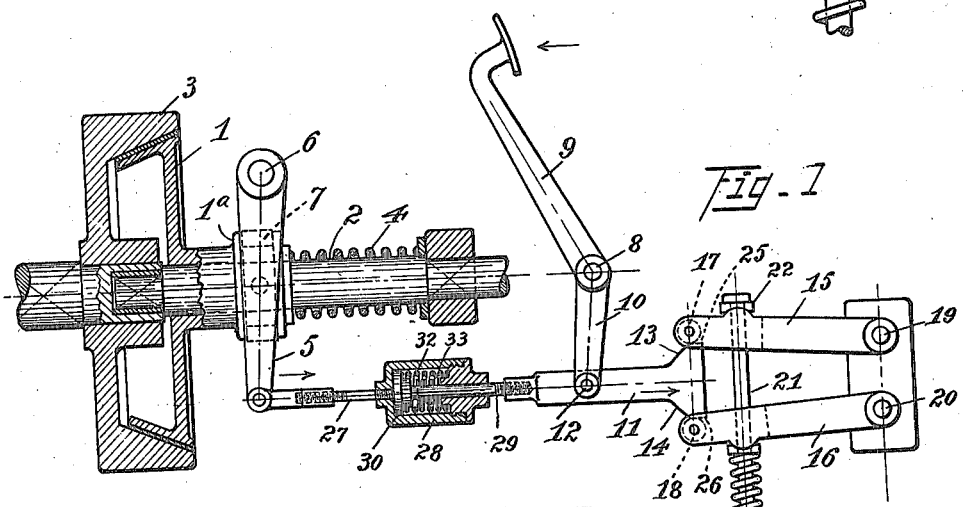
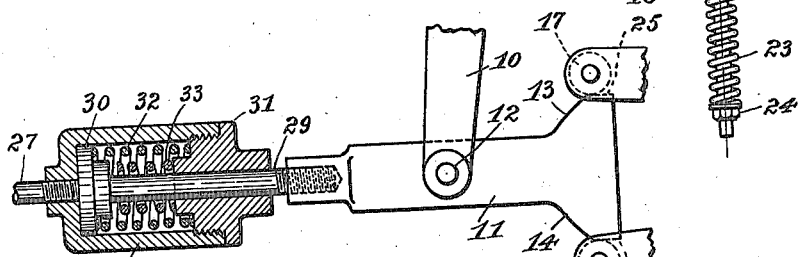
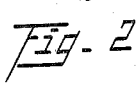
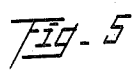
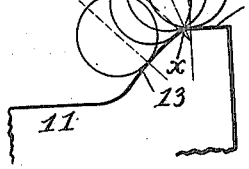
INVENTOR.
Joseph H. Dearborn.
BY Louis F. Griswold
ATTORNEY

UNITED STATES PATENT OFFICE.

JOSEPH H. DEARBORN, OF CLEVELAND, OHIO.

SPRING-COUNTERBALANCING MECHANISM.

1,233,758.

Specification of Letters Patent. Patented July 17, 1917.

Application filed March 23, 1916, Serial No. 86,177. Renewed June 12, 1917. Serial No. 174,409.

*To all whom it may concern:*

Be it known that I, JOSEPH H. DEARBORN, a citizen of the United States, residing at Cleveland, in the county of Cuyahoga and State of Ohio, have invented a certain new and useful Improvement in Spring-Counterbalancing Mechanism, of which the following is a specification.

This invention relates to counterbalancing or compensating mechanism adapted to overcome, with a reduced force, the pressure of a spring that operates expansively for a given purpose, when it is desired to compress or reverse the action of said spring, the object of the invention being the provision of simple, durable, and efficient means whereby a comparatively small amount of power is required to counteract a greater power of the operating spring.

The invention consists in the combination and arrangement of a series of co-acting levers, spring, cams, and connecting members, whereby the application of a comparatively light pressure on an actuating member results in the compression of the operating spring which is of greater expansive pressure.

While there is a broad range of utility for the present invention, it is particularly adaptable and efficient in the operation of automobile clutches, therefore the improvement is illustrated in the accompanying drawings forming a part of this specification as an embodiment of spring operative clutch mechanism.

In the drawings Figure 1 illustrates the co-acting elements of the invention as assembled and in their normal position, certain parts being in section.

Fig. 2 is an enlarged fragmentary view of certain parts of the mechanism in their normal arrangement.

Fig. 3 is a fragmentary view showing the relative position of certain parts when the operating spring has been compressed the desired amount.

Fig. 4 illustrates a modification of a portion of the device, and Fig. 5 is a diagrammatic view shown for the purpose of facilitating the understanding of the initiative stage of the operation of the mechanism.

Similar characters of reference are employed to designate similar parts in the drawings and specification.

Referring now to the drawings, 1 represents a truncated cone clutch member of the ordinary type, adapted to slide longitudinally on the shaft 2 and automatically held in engagement with the member 3 by the expansion spring 4. The yoke lever 5 fulcrumed at 6 and swiveled to the collar 7 which is loosely mounted in a channel of the hub 1ª, provides means for disengaging the clutch member, by compressing the spring 4 when power is applied to the member 5 in the direction of arrow Fig. 1.

The part of the mechanism above described is old and well known in the art and only forms a part of the present invention in its combination with the other elements, the salient features of the improvement consisting in the means for operating the member 5 against the pressure of the spring 4.

In order to insure a positive engagement of the members 1 and 3, in practice a very stiff or high pressure spring 4 is employed. In the ordinary method of releasing the clutch a simple lever has been used, one arm of said lever being connected by a connecting rod with the yoke 5 and said lever being actuated by pressure on the free end or in other words on the arm on the opposite side of the fulcrum. This necessitates a pressure on the free end of the actuating lever equal to, more or less than the expansive pressure of the clutch operating spring, according to the relative proportions of the two arms of the actuating lever. I reduce the power required to compress the spring 4, by providing a lever fulcrumed at 8 and having an actuating arm 9. The arm 10 of the lever is pivotally attached to a member 11 at 12. The member 11 is provided with cam faces 13 and 14 and is adapted to operate between the jaws 15 and 16, the said jaws being provided with rollers 17 and 18 which in the operation of the device bear on the opposite sides of the member 11 and travel on the cam faces 13 and 14. In the embodiment of the invention as illustrated the two jaws 15 and 16 are pivoted, respectively at 19 and 20, but it will readily be seen that one of the jaws may be stationary and the desired result obtained. The rod 21 provided with a head 22 extends through the jaws 15 and 16 and has an expansion spring 23 mounted thereon. The head 22 bearing on one side of one of the jaws and the spring 23 bearing on the opposite side of the other jaw and held under tension by the nut 24 forces the jaws toward each other. The spring 23 therefore performs a compensating function, as the tension of said spring is so adjusted that the pressure on the jaws 15 and 16 will cause the rollers 17 and 18, bearing on the cams 13 and 14 to force the member 11 in the direction of arrow.

In the normal position with the clutch thrown into engagement as shown in Fig. 1 the rollers 17 and 18 bear on the longitudinal plain surfaces 25 and 26, their centers being just a trifle beyond the intersection planes of the cams 13 and 14 with the longitudinal surfaces 25 and 26.

Pivotally connected with the lever 5 is a connecting rod 27 provided with a barrel member 28. The member 11 is also provided with a connecting rod 29 having a head 30 thereon, the said head adapted to operate within the barrel 28. Within the barrel and interposed between the head 30 and the barrel cap 31 are spiral springs 32 and 33, the functions of which will presently be explained.

The operation of the device is as follows: With the parts in the normal position pressure is applied to the lever 9 as shown by arrow. The initial pressure on the lever carries the rollers from the position a—see Fig. 5—over the point x to the position b, the head 30 compressing the spring 32. As the rollers travel on the cams 13 and 14 from the positions a to b and b to c under pressure of the spring 23 the angle of incidence decreases, thereby causing a more acute angular thrust on the member 11, and less resistance to the action of the spring 23; however a uniform movement of the member 11 is maintained by the springs 32 and 33, as during the primary movement of the rollers 17 and 18 the spring 32 is compressing and as the angle decreases the head 30 compresses the spring 33, the increasing resistance of the springs 32 and 33 compensating the decreasing resistance of the thrust. When the springs 32 and 33 are packed or closed the pull is transmitted direct to the lever 5 through the connecting rod 27, resulting in the compression of the operating spring 4, counterbalanced by the spring 23 and the pressure on the actuating lever 9.

A variable spring 34 similar to that shown in Fig. 4 may be substituted for the springs 32 and 33 and the same result obtained.

While I have shown and described a practical embodiment of the present improvement, it will be understood that the mechanism is applicable to other purposes and admits of a variety of changes in construction, design and arrangement of parts without departing from the spirit of the invention, the limitations being governed by the scope of the claims and the existing state of the art.

What I claim as my invention and desire to secure by Letters Patent is.

1. Mechanism for counterbalancing expansion spring pressure, consisting of an opposing member bearing on the spring, a connecting rod attached to said opposing member, a cam member operating between spring compressed jaws, a connecting rod attached to said cam member, resilient connecting means between the two connecting rods, and an actuating lever for operating the cam member in conjunction with the spring compressed jaws whereby compensating force is exerted in opposition to the pressure of the expansion spring.

2. In mechanism for counterbalancing the pressure of a spring operating expansively, the combination of an opposing member bearing on the spring; a connecting rod attached to said opposing member; a spring barrel attached to said connecting rod; a secondary connecting rod extending from said barrel member and under pressure of one or more springs in said barrel: a cam member connected with said secondary rod; spring compressed jaws between which the cam member is operative; tension means for compressing the jaws; and a lever attached to the cam member for operating said member in conjunction with the spring pressed jaws.

3. In mechanism for counterbalancing the pressure of a spring operating expansively, the combination of an opposing member bearing on the spring; a connecting rod attached to said opposing member; a spring barrel attached to said connecting rod; a secondary connecting rod extending from said barrel in alinement with the first mentioned connecting rod and under pressure of one or more springs in said barrel; a cam member connected with said secondary rod; spring compressed jaws between which the cam member is operative; tension means for compressing the jaws; rollers on said jaws that bear on the cam member; and a lever for operating said cam member in conjunction with the spring pressed jaws.

4. In mechanism for counterbalancing the pressure of a spring operating expansively, the combination of an opposing member bearing on the spring; jaw members held under compressed tension; means for maintaining said tension; a cam member operative between said jaws; two alined connecting rods between the cam member and the spring opposing member; compensating connecting means between the connecting rods; and a lever for operating the cam member in conjunction with the compressed jaws and in opposition to the said compensating means.

5. In mechanism for counterbalancing the pressure of a spring operating expansively, the combination of an opposing member bearing on the spring; jaw members held under compressed tension; means for maintaining said tension; a cam member operative between said jaws; anti-friction means on said jaws bearing on the cam member; two alined connecting rods between the cam member and the spring opposing member; compensating connecting means between the connecting rods; and a lever for operating the cam member in conjunction with the compressed jaws.

6. In mechanism for counterbalancing a spring operating expansively, the combination of an opposing member bearing on the spring; jaw members under compressed tension; a compensating spring for maintaining said tension; a cam member operative between said jaw members; connecting means between said cam member and the spring opposing member; and a lever attached to said connecting means for operating the cam member in conjunction with the spring pressed jaws.

JOSEPH H. DEARBORN.

Witnesses:
O. C. BILLMAN,
L. F. GRISWOLD.